United States Patent [19]

Teske et al.

[11] Patent Number: 4,637,272
[45] Date of Patent: Jan. 20, 1987

[54] BALLSCREW ACTUATOR

[75] Inventors: Duane R. Teske, Rockford, Ill.; Henry E. Senasack, Jr., Annapolis, Md.; Mark Wilkins, Burke, Va.

[73] Assignee: Sundstrand Corporation, Rockford, Ill.

[21] Appl. No.: 791,692

[22] Filed: Oct. 28, 1985

[51] Int. Cl.[4] .............................................. F16H 1/00
[52] U.S. Cl. ............................ 74/424.8 R; 74/89.15; 74/661; 74/665 GD; 192/48.9; 192/94; 244/75 R
[58] Field of Search ............... 74/89.15, 424.8 R, 661, 74/665 GD; 192/48.1, 48.9, 48.8, 67 A, 94; 244/75 R, 231

[56] References Cited

U.S. PATENT DOCUMENTS

| | | | |
|---|---|---|---|
| 2,471,857 | 5/1949 | Bleakney et al. | 244/75 R |
| 2,569,542 | 10/1951 | Skidmore et al. | 74/424.8 R |
| 2,660,026 | 11/1953 | Geyer | 74/424.8 R |
| 2,660,029 | 11/1953 | Geyer | 74/424.8 R |
| 2,692,661 | 10/1954 | Bertsch et al. | 74/424.8 R |
| 2,740,302 | 4/1956 | Keyser | 74/424.8 R |
| 2,869,386 | 1/1959 | Hoover | 74/424.8 R |
| 3,483,765 | 12/1969 | Fornataro | 74/89.14 |
| 3,766,790 | 10/1973 | Weir | 74/89.15 |
| 4,179,944 | 12/1979 | Conner | 74/89.15 |
| 4,199,999 | 4/1980 | Metz | 74/89.15 |
| 4,429,592 | 2/1984 | Stevenson | 74/625 |
| 4,459,867 | 7/1984 | Jones | 74/89.15 |

Primary Examiner—Cornelius J. Husar
Assistant Examiner—Joseph A. Fischetti
Attorney, Agent, or Firm—Wood, Dalton, Phillips, Mason, & Rowe

[57] ABSTRACT

There are many requirements for an actuator where safety considerations dictate several independent means of actuation. This invention pertains to an actuator utilizing a single ballscrew with drive units associated therewith to provide a level of redundancy which permits full performance with any one credible failure and emergency performance with any two credible failures and, thus, the actuator is dual failure tolerant with full performance after any two credible failures.

The ballscrew actuator has a pair of rotatable ballnuts associated with a ballscrew and carried by separate housings movable toward and away from each other. The ballscrew is twice the length of the desired actuating movement, with one-half of the length of the ballscrew being stored in each housing. Primary and backup drive units each having a drive motor are carried by one housing and each have a worm gear set and a selectively engageable clutch for selective driving of the first ballnut. A second housing mounts an emergency drive unit having a drive motor which, through a worm gear set, drives a second ballnut. Normal operation of the actuator is derived from operation of either the primary or backup drive units and, when there is a failure in the operation of both of these drive units, the emergency drive unit can be operated to assure movement of the actuator for safe positioning of a device moved by the actuator, such as the payload and support structure of a space vehicle.

19 Claims, 5 Drawing Figures

BALLSCREW ACTUATOR

The Government has rights in this invention pursuant to Contract No. N00014-84-C-2051 awarded by the Naval Research Laboratory.

TECHNICAL FIELD

This invention pertains to a ballscrew actuator for achieving relative movement between two members and which is dual failure tolerant to provide full operating performance after any two failures of parts of the ballscrew actuator which have a credible failure potential. More particularly, the ballscrew actuator has particular utility for use in positioning and moving structure which must be at a specific location to avoid a catastrophic hazard, such as moving payload and support structure for a space vehicle to a stowed position to enable closure of the payload bay door structure.

BACKGROUND ART

Ballscrew actuators have been used for achieving relative movement between and positioning of members in many different environments, for example, for positioning of flight control surfaces of aircraft.

In certain applications, dual failure tolerant capability is required and one way of achieving this is by using two actuators, each having a ballscrew. There are a number of shortcomings in such a system to provide dual failure tolerant capability for moving and positioning mechanism of a space vehicle. The use of a pair of actuators can result in a failure in one actuator locking the entire drive train, thus preventing the other actuator from operation. To prevent this, a disconnect mechanism, such as a pyrotechnic device, pin puller or clutch is required or, in the case of a space vehicle, it may be necessary for a person to leave the vehicle and disconnect the disabled actuator. In addition, there must be a method of discriminating as to which of the actuators has failed, so that the correct one is disconnected.

The foregoing problems have been solved in various ways, but with considerable proliferation of parts and the solution has usually resulted in a number of elements which cannot be allowed to fail. Such elements constitute potential single failure points which can defeat the failure tolerance rationale of the actuator. These elements have to be designed to be noncredible failures, that is, they will not fail. Whether or not an element is a noncredible failure element can be the subject of controversy and normally a design goal is to minimize the elements requiring this designation.

The Weir U.S. Pat. No. 3,766,790 discloses a ballscrew linear actuator having redundant critical components. In the Weir patent structure, there are two drive mechanisms associated one with each of a pair of members to be moved relative to each other. Each drive mechanism has a ballnut rotatably mounted on a common ballscrew. In the structure of this patent, the ballscrew can be designed to be a noncredible failure, i.e., will not fail. However, there are a number of components which are subject to a credible failure, i.e., components that may fail. In the patent structure, a number of these components in addition to the ballscrew would need to be noncredible failure items to render the actuator single failure tolerant and an even greater number of these components would need to be noncredible failure items to render the mechanism dual failure tolerant.

The Grimm et al application Ser. No. 686,984, filed Dec. 27, 1984 and owned by the assignee of this application, discloses a jam tolerant redundant drive ballscrew actuator wherein a pair of primary drive units drive a ballnut. The two drive units operate through a gearbox to drive the ballnut. In the event of a failure of the primary drive units, there is a backup drive that can be brought into operation to cause operation of the actuator. A ballnut jam can result in halving the stroke of the actuator. There is also structure, such as a brake mechanism, which must be a noncredible failure item in order to make the actuator dual failure tolerant.

The ballscrew actuator disclosed in this application distinguishes over the prior art by providing full performance after any two failures of credible failure components while, in the prior art, the actuators are, for all practical purposes, single failure tolerant devices and with degraded performance resulting from some single failures of credible failure components.

DISCLOSURE OF THE INVENTION

A primary feature of the invention is to provide a ballscrew actuator which is dual failure tolerant with full operating performance even after failure of two components in the mechanism of the actuator which have the potential for failure.

The invention provides redundancy in the ballscrew actuator by having a first housing with separate primary drive and backup drive units associated with a ballnut rotatably mounted on a ballscrew and with clutches associated with each drive unit to permit the drive of the ballnut from either drive unit. In the event there is failure in both the primary and backup drive units, there is an additional emergency drive unit carried by a second housing which is connected in driving relation with a second ball nut rotatably mounted on the ballscrew. The housings connect to a pair of members to be moved relative to each other and the ballscrew has a length approximately twice the required distance of movement between the members. Approximately one-half the length of the ballscrew is normally stowed in the second housing mounting the emergency drive unit.

In normal operation, either the primary drive or backup drive unit can be clutched to the associated ballnut for imparting linear movement to the ballscrew to cause relative movement between the housings. Upon failure in the primary and backup drive units, the emergency drive unit can be operated to cause rotation of the second ballnut which acts on the ballscrew to impart linear movement thereto. Each of the drive units has a drive motor with a drive train including a worm gear engaging a worm wheel to provide a nonback driving relation between the ballnuts and the drive motors.

The ballscrew actuator has components which can fail. A critical component that would render the ballscrew actuator non-failure tolerant is the ballscrew which is an element common to both ballnuts. The ballscrew can be rendered a noncredible failure component by design thereof. In order for the disclosed ballscrew actuator to be dual failure tolerant, consideration also has to be given to the possibility of a ballnut jam or ballnut bearing jam. These components can be designed to also be deemed noncredible failure items to render the ballscrew actuator dual failure tolerant with full performance even after two failures.

More particularly, the ballscrew actuator has a linear ballscrew upon which two independent ballnuts are mounted. Each ballnut is enclosed in its own housing forming, in essence, two independent actuators free to each transit a portion of the ballscrew with dual fault tolerance being achieved by providing each housing with the full stroke necessary for the required movement between the housings. In normal operation, one ballnut having the primary and backup drive units associated therewith is used to extend or retract the actuator and there can be full performance with failure of one of the drive units. If a combination of two failures immobilizes the primary and backup drive units, the second ballnut is activated by operation of an emergency drive unit and this mechanism serves in an emergency by paying out a length of the ballscrew which is stored within the associated housing.

A primary use of the ballscrew actuator is in movement and positioning of a payload and support structure for a space vehicle, wherein it is necessary to assure that the payload and support structure is returned to a stowed position within the vehicle to enable closure of space vehicle doors. In normal operation, the primary and backup drive units move and position the payload and support structure. The emergency drive unit can be operated upon failure of the primary and backup drive units to stow the payload and support structure in order to avoid a catastrophic hazard which could result if the doors of the space vehicle could not be closed.

An object of the invention is to provide a ballscrew actuator having a pair of housings movable relative to each other, with each housing rotatably mounting a ballnut associated rotatably with a linear ballscrew common to both ballnuts, independently operable primary and backup drive units associated with one housing and ballnut to provide single failure tolerance in normal operation of the actuator, and an emergency drive unit on the other housing associated with the second ballnut and which can be operated upon failure of the primary and backup drive units to provide dual failure tolerance with full performance of the ballscrew actuator.

Another object of the invention is to provide a ballscrew actuator utilizing a single ballscrew and which is dual failure tolerant comprising, a pair of housings, a pair of ballnuts rotatably associated with the ballscrew and rotatably mounted one in each housing, said ballscrew having a length stored in each housing when said housings are in proximate relation to each other, a first of said pair of housings rotatably mounting a first of said pair of ballnuts, a primary drive unit and a backup drive unit mounted on said first housing for selectively rotating said first ballnut, each of said drive units including a drive motor, a shiftable clutch, and means for engaging and disengaging the clutch with the first ballnut, a second of said housings rotatably mounting a second of the ballnuts, and a third drive unit mounted on said second housing including a drive motor geared to the second ballnut.

Still another object of the invention is to provide a ballscrew actuator as defined in the preceding paragraph wherein said ballscrew has a length at least twice the desired stroke of the actuator and approximately one-half the length is stored in said second housing during operation by a drive motor of either of said primary and backup drive units.

An additional object of the invention is to provide a ballscrew actuator utilizing a single linear ballscrew and which is dual failure tolerant comprising, a pair of ballnuts on said ballscrew which may translate relative to each other lengthwise of said linear ballscrew, first and second housings for connection one with each of a pair of members that are to be moved relative to each other and each having one of the ballnuts rotatable therein, a pair of independently operable drive units on the first housing and each having a drive motor, means for drivingly connecting one or the other of said drive motors to a first of said pair of ballnuts rotatable in the first housing including clutch means having disengaged positions and engaged positions for connecting one or the other of the drive motors to said first ballnut, and a third drive unit on the second housing including a drive motor, and means drivingly connecting the third drive unit motor to the second of said pair of ballnuts.

BEST MODE FOR CARRYING OUT THE INVENTION

Figure 1:
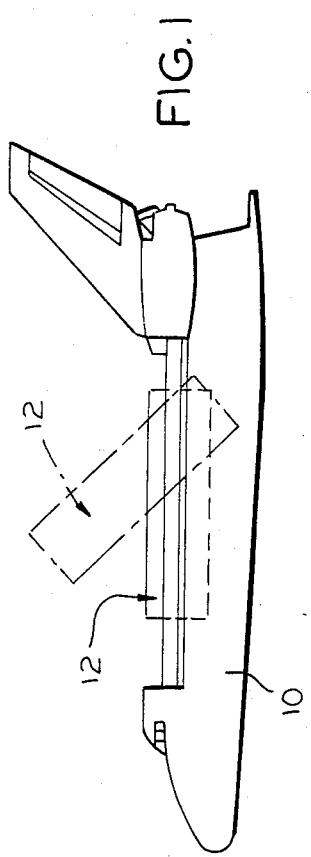
FIG. 1 is a schematic of a space vehicle showing a payload and support structure in two positions.
Figure 3:
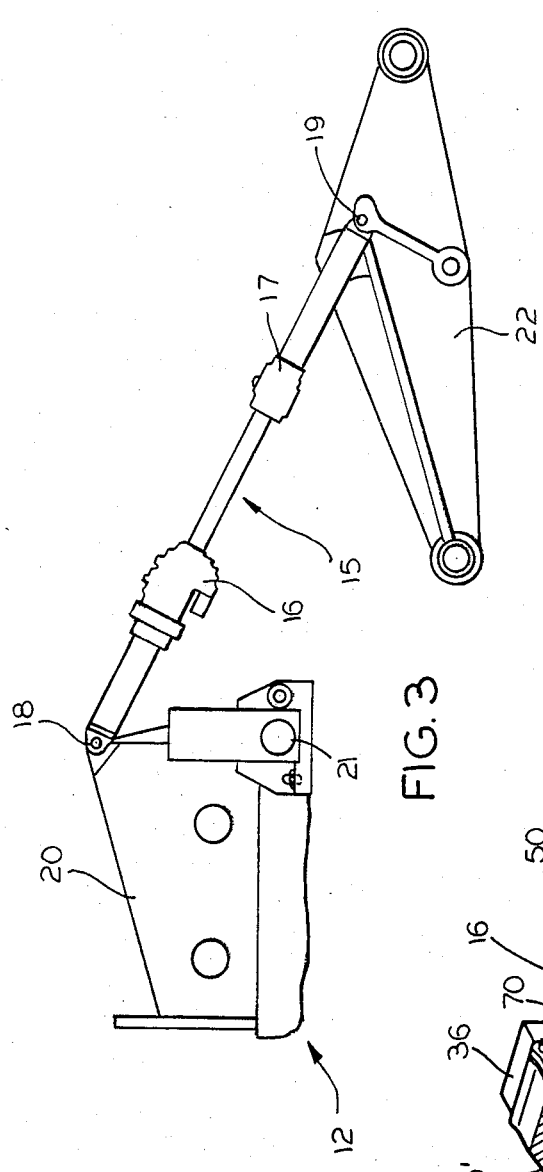
FIG. 3 is a fragmentary side elevational view of the ballscrew actuator in association with structure for positioning of the payload and support structure shown in FIG. 1.

One use for the ballscrew actuator wherein dual failure tolerant capability with full performance after two failures is required is illustrated in FIGS. 1 and 3. A space vehicle 10 has a payload and support structure 12 movable between a stowed position, shown in full line, and a deployed position, shown in broken line. The payload and support structure 12 is extendable beyond the payload bay door envelope and, if after use, the payload and support structure cannot be brought back to the stowed position, the closure of the door mechanism is prevented. This can be a catastrophic hazard, since it could prevent safe return of the space vehicle.

Referring to FIG. 3, the ballscrew actuator is indicated generally at 15 and has a pair of housings 16 and 17, each having a monoball spherical bearing 18 and 19, respectively, at an end thereof. The monoball spherical bearing 18 provides a connection of the housing 16 to a member, such as a fitting 20 defining part of the payload and support structure 12 and which is pivotally mounted at 21 to provide for the movement of the payload and support structure between the two positions shown in FIG. 1. The monoball spherical bearing 19 provides a connection for housing 17 to another member, such as a support bridge 22 of the space vehicle.

With the payload and support structure 12 in stowed position, the fitting 20 is in the position shown in FIG. 3 and the ballscrew actuator is extended with the housings 16 and 17 at a distance from each other. When the payload and support structure 12 is to be deployed, the ballscrew actuator is activated to move the housing 16 toward housing 17 and pivot the fitting 20 clockwise about the pivot 21.

Figure 5:
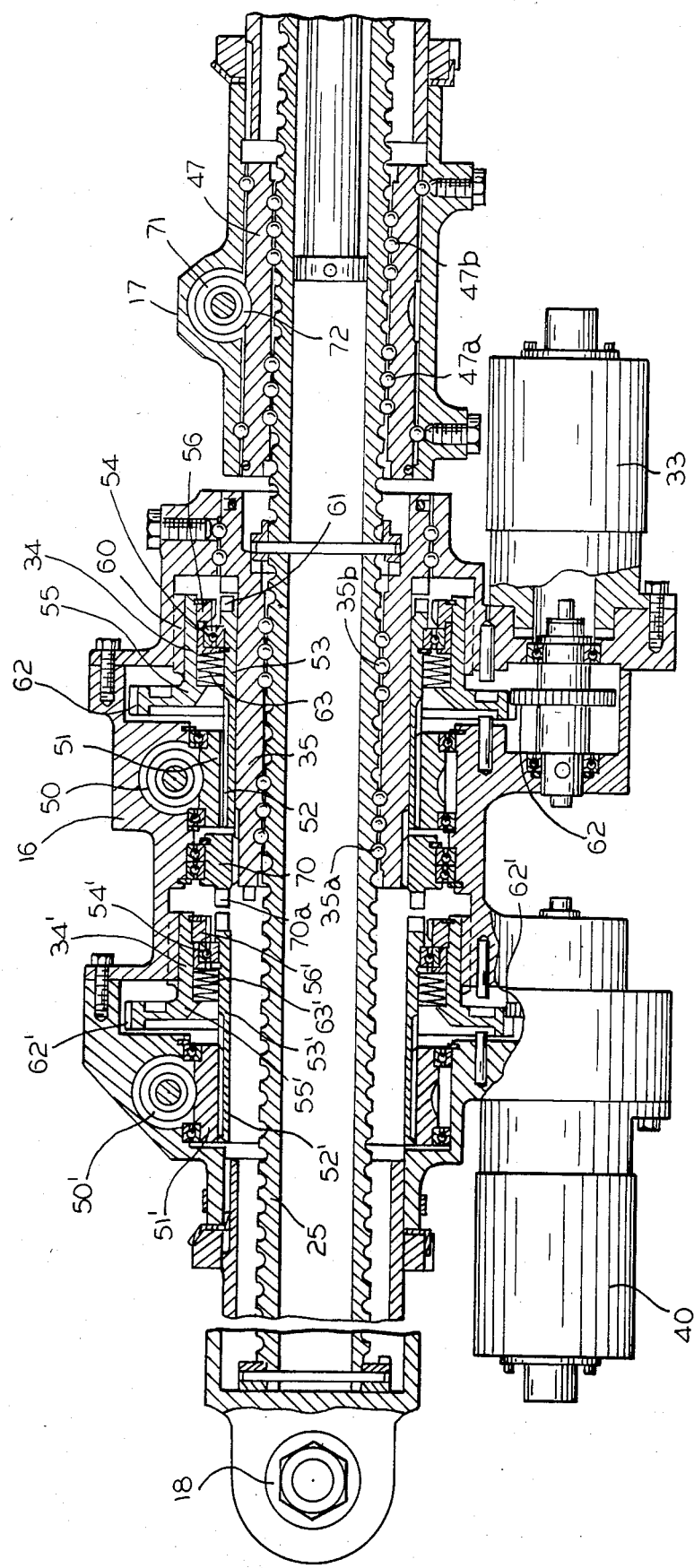
FIG. 5 is a sectional view of the ballscrew actuator illustrated in FIG. 4.

Referring to the schematic showing of FIG. 5, the ballscrew actuator has a ballscrew 25 which has a length approximately equal to twice the distance of movement between the housings 16 and 17. In normal operation, there is linear movement of the ballscrew relative to the housing 16 and in emergency operation there can be linear movement of the ballscrew 25 with respect to either or both the housing 16 and the housing 17.

Figure 2:
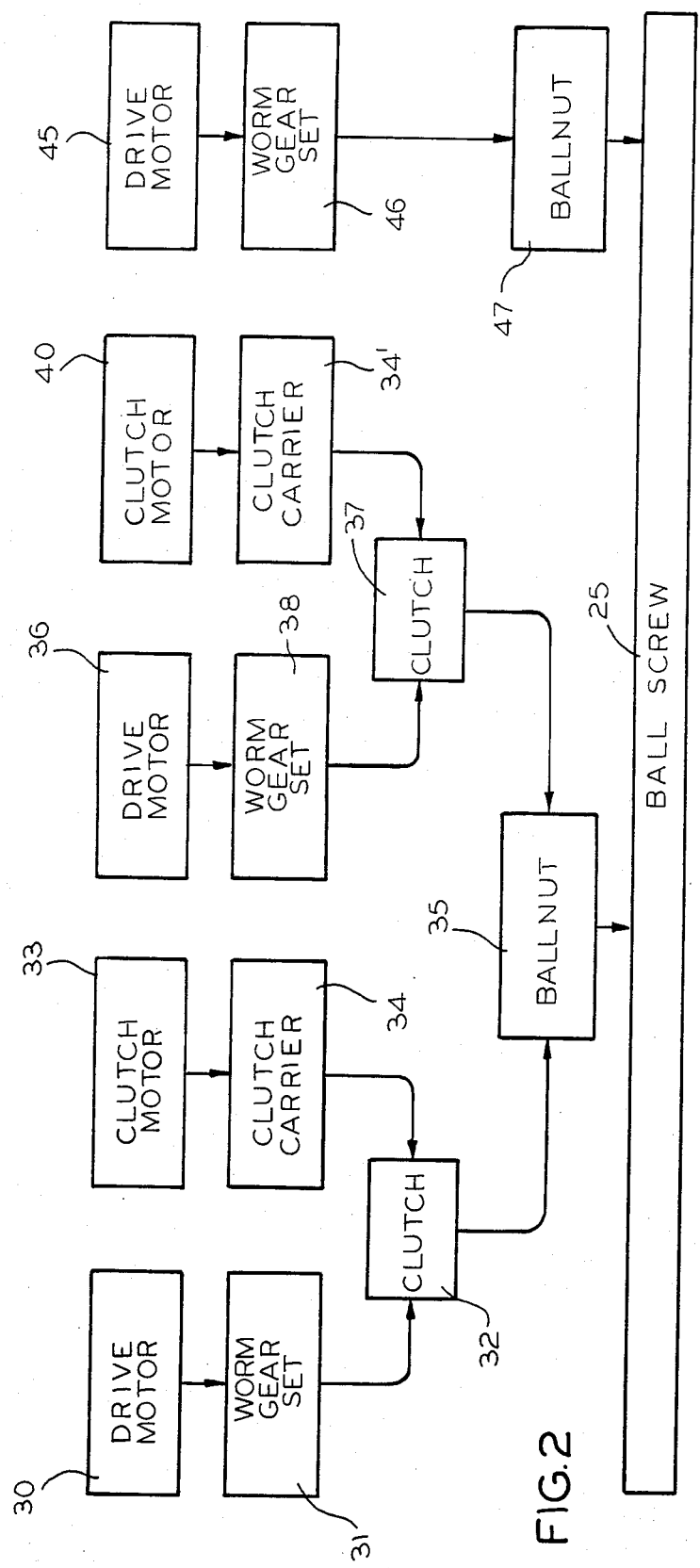
FIG. 2 is a block diagram of the ballscrew actuator.

A block diagram for the ballscrew actuator is shown in FIG. 2 and illustrates the general arrangement of structure for achieving a dual failure tolerant capability The housing 16 has a rotatable ballnut 35 rotatable relative to the ballscrew 25 and this ballnut can be rotatably driven by either a primary drive unit or a backup drive unit which are of similar construction and independently operable.

The primary drive unit has a drive motor 30 which, through a worm gear set 31 drives a selectively, engageable clutch 32 selectively-connectable, in a manner to be described, to the ballnut 35. Selective engagement of the clutch 32 is controlled by a clutch motor 33 which drives a clutch carrier 34. The backup drive unit has a drive motor 36 which drives a selectively-engageable clutch 37 through a worm gear set 38 with the clutch being selectively-engageable with the ballnut 35 through operation of a clutch motor 40 which operates a clutch carrier 34'.

A third emergency drive unit has a drive motor 45 which, through a worm gear set 46, may drive a second ballnut 47 rotatable in the housing 17 and rotatably associated with the ballscrew 25.

Figure 4:
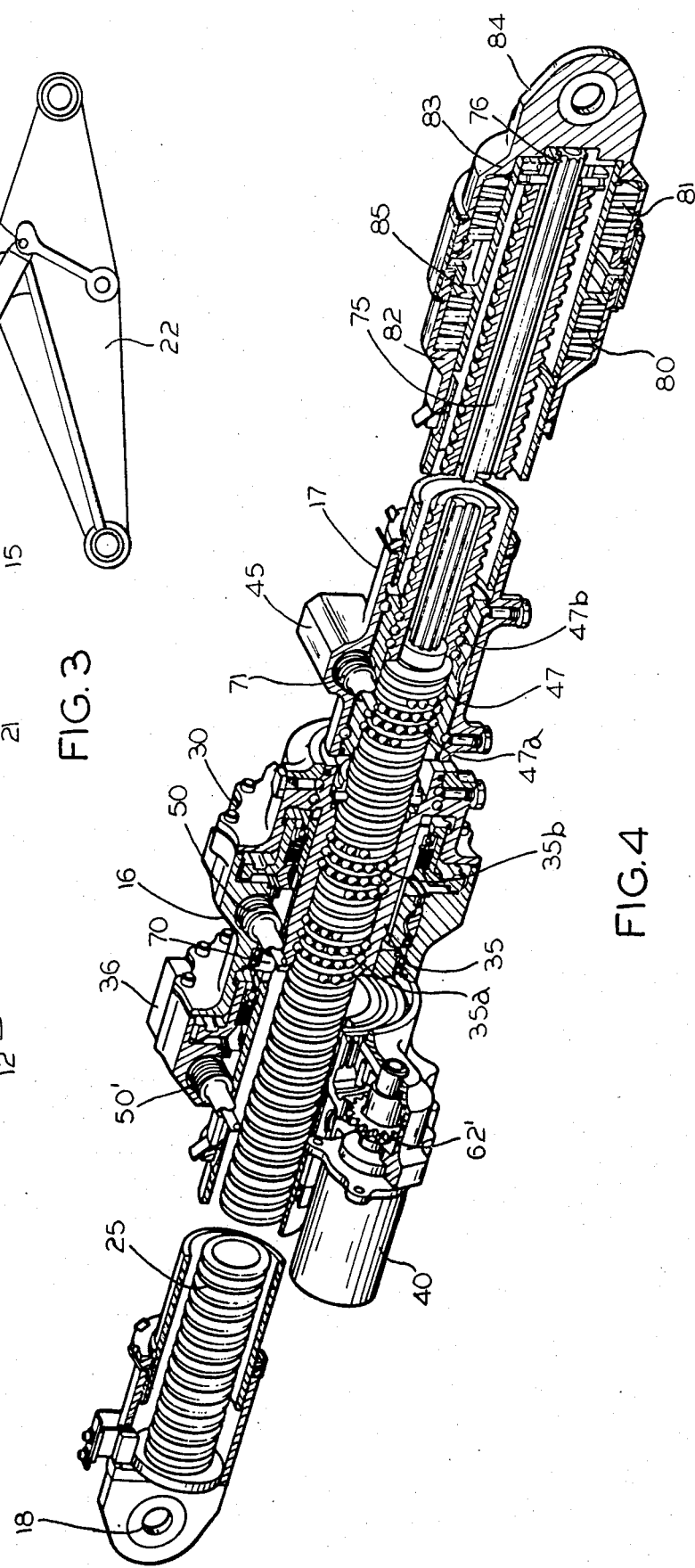
FIG. 4 is a perspective cut-away view of the ballscrew actuator with the drive unit motors which actually overlie the clutch motors being relocated from a removed housing section to assist in visualizing the combination of structure.

The details of the structure illustrated by the block diagram of FIG. 2 are shown in FIGS. 4 and 5. FIGS. 4 and 5 show the mechanism by which primary drive motor 30 drives the ballnut 35. The similar mechanism for drive of the ballnut 35 by backup drive motor 36 has been given the same reference numerals in FIG. 5 with a prime affixed thereto. The primary drive motor 30 has an output shaft connected to a worm gear 50 in mesh with a worm wheel 51 in the form of an annular member rotatably supported in the housing 16 by bearings and having an internal spline 52 for rotatable connection to a cylindrical clutch element 53 which is in surrounding spaced relation to the first ballnut 35. The clutch element 53 has a surrounding bearing 54 captured between spaced-apart flanges 55 and 56 of the clutch carrier 34. The clutch carrier 34 has an externally-threaded section in threaded engagement with an internally-threaded annular section 60 of the housing 16 whereby rotation of the clutch carrier 34 will result in advance or retraction thereof and control the engagement of clutch teeth 61 on the clutch element 53, with coacting clutch teeth on the ballnut 35. The rotation of the clutch carrier 34 is caused by operation of the clutch motor 33 which rotates the clutch carrier through a spur gear set 62. The engagement of the clutch teeth is yieldably achieved by interposing yieldable springs 63 between the bearing 54 and the clutch carrier flange 55.

The ballnut 35 has two ball circuits 35a and 35b associating the ballnut with the ballscrew 25. The ballnut has a tubular extension 70 spline-connected thereto with clutch teeth 70a which coact with a clutch element 53' of the backup drive unit.

The emergency drive unit is shown in FIGS. 4 and 5 and has an output shaft from the drive motor 45 connected to a worm gear 71 of the worm gear set 46 which meshes with a worm wheel 72 carried on the exterior of the second ballnut 47.

Each of the worm gear sets 31, 38 and 46 having a worm gear provides a nonback driving ability. When the first ballnut 35 is being rotated by one or the other of the drive motors 30 and 36, the drive motor 45 and worm gear set 46 of the emergency drive unit lock the second ballnut 47 against rotation.

The linear ballscrew 25 is free to move lengthwise of the housings 16 and 17, but is held against rotation relative to the housings by an anti-rotation spline member 75 fixed at one end to an end of the interior opening in the housing 17, as indicated at 76, and which extends into the interior of the ballscrew 25. The spline connection permits longitudinal relative movement between the second housing 17 and the ballscrew, while preventing rotation of the ballscrew. The connection of the housings 16 and 17 to the members to be moved is a connection which prevents rotation of the housings about an axis extending longitudinally of the ballscrew actuator.

As seen in FIG. 5, the ballnut 47 also has two ball circuits 47a and 47b associating the ballnut and ballscrew to provide adequate load-carrying capability and buckling stability.

One embodiment of the ballscrew actuator has a load relief device, as illustrated in FIG. 4. Two sets 80 and 81 of Belleville springs are positioned between flanges 82 and 83 of a tubular relatively movable end member 84 of the housing 17. The springs also are positioned at opposite sides of a flange 85. Under various operating conditions, there can be induced relative motion between the members to which the ballscrew actuator is connected and the preloaded Belleville springs 80 and 81 provide load relief under either excessive compressive or tensile loading by permitting relative movement between the parts of the housing 17.

In operation, if a combination of two failures immobilizes the primary and backup drive units, the drive motor 45 of the emergency drive unit is brought into operation to activate the second ballnut 47. The ballscrew has a length approximately equal to twice the length of required movement and each housing stores one-half the length. In normal operation, approximately one-half the length of the ballscrew 25 is stored in the housing 17 and, thus, operation of the ballnut 47 will pay out a length of ballscrew from the housing 17. Combinations of failures which will result in either failed fixed or failed free situations in the housing 16 can be handled. In a failed free situation in the housing 16, there will be full extension of the ballscrew 25 from the housing 17 to return the payload and support structure to stowed position.

The disclosed structure greatly reduces the number of single point failure items which need noncredible failure status. The single ballscrew 25 can be designed with generous safety margins and subject to fracture analysis and control to render it a noncredible failure.

It will be noted that the ballscrew actuator could be rendered inoperative if both of the ballnuts 35 and 47 were to jam. However, this possibility can be deemed a noncredible failure mode because of the ballnuts each having two independent ball circuits along with design features and production techniques in formation and assembly of the ballnuts.

The disclosed ball actuator utilizes a ballscrew 25 with two times the required stroke and with a pair of rotatable ballnuts 35 and 47, each of which are capable of transiting one-half the length of the screw. There are two independent methods of driving the first ballnut 35, each consisting of a drive motor, a worm gear set and a clutch, and one drive for the second rotatable nut 47 consisting of the drive motor 45 and worm gear set 46. The ballscrew actuator has a minimum number of non-credible failure items to achieve dual failure tolerance and is dual failure tolerant with continued full performance with respect to speed of operation, length of stroke and transmitted force. Whether the failure in the primary or backup drive units is failed fixed or failed free is unimportant and failure tolerance is independent of the nature of the failure.

We claim:

1. An actuator utilizing a single linear ballscrew and which is dual failure tolerant comprising, a pair of ballnuts on said ballscrew which may translate relative to each other lengthwise of said linear ballscrew, first and second housings for connection one with each of a pair of members that are to be moved relative to each other and each having one of the ballnuts rotatable therein, a pair of independently operable drive units on the first housing and each having a drive motor, means for drivingly connecting one or the other of said drive motors to a first of said pair of ballnuts rotatable in the first housing including clutch means having disengaged positions and engaged positions for connecting one or the other of the drive motors to said first ballnut, and a third drive unit on the second housing including a drive motor, and means drivingly connecting the third drive unit motor to the second of said pair of ballnuts.

2. An actuator as defined in claim 1 wherein said linear ballscrew has a length at least twice the desired stroke of the actuator and approximately one-half the length of the linear ballscrew is stored in said second housing during operation by a drive motor of either of said independently operable drive units.

3. An actuator as defined in claim 1 wherein the means drivingly connecting the third drive unit motor to the second ballnut includes nonback driving gearing.

4. An actuator as defined in claim 1 wherein said linear ballscrew is movable lengthwise of said second housing when said third drive unit motor is operated.

5. An actuator as defined in claim 1 including means connecting said linear ballscrew to said second housing to permit linear movement therebetween while preventing relative rotation.

6. An actuator as defined in claim 5 including preloaded spring means between movable components of said second housing to limit the loading transmitted through the actuator.

7. An actuator as defined in claim 1 wherein each of said independently operable drive units includes a motor-driven worm gear and a worm wheel for transmitting motion to the associated ballnut, said clutch means including a pair of clutches associated one with each of the drive motors of the independently operable drive units, and said worm wheels being splined one to each of said clutches to permit relative movement between a worm wheel and a clutch.

8. An actuator as defined in claim 1 wherein said linear ballscrew is movable lengthwise of said second housing, and said means drivingly connecting the third drive unit motor to the second ballnut includes a worm gear preventing rotation of said second ballnut in response to linear movement of the ballscrew by rotation of said first ballnut whereby the second housing moves linearly with the ballscrew.

9. A ballscrew actuator utilizing a single ballscrew and which is dual failure tolerant comprising, a pair of housings connectable one to each of a pair of members that are to be moved relative to each other, a pair of ballnuts rotatably associated with the ballscrew and rotatably mounted one in each housing, said ballscrew having a length approximately equal to twice the distance of movement between said members and being stored approximately one-half in each housing when said members are in proximate relation to each other, a first of said pair of housings rotatably mounting a first of said pair of ballnuts, a primary drive unit and a backup drive unit mounted on said first housing for selectively rotating said first ballnut, each of said drive units including a drive motor, a driven worm gear, a shiftable clutch geared to the worm gear, and means for engaging and disengaging the clutch with the first ballnut, a second of said housings rotatably mounting a second of the ballnuts, and an emergency drive unit mounted on said second housing including a drive motor and a driven worm gear geared to the second ballnut.

10. A ballscrew actuator as defined in claim 9 including means connecting said ballscrew to said second housing to prevent rotation of the ballscrew relative thereto while permitting longitudinal movement relative to each other.

11. A ballscrew actuator as defined in claim 10 wherein said actuator is used for positioning and deployment and stowing movements of mechanism connected to one of said housings with said movements being caused by operation of either the primary or backup drive units and wherein the mechanism is deployed when the housings are proximate each other, and the emergency drive unit being operable to return the mechanism to stowed position by extending the ballscrew from the second housing and causing separating movement of the housings.

12. A ballscrew actuator utilizing a single ballscrew and which is dual failure tolerant comprising, a pair of housings, a pair of ballnuts rotatably associated with the ballscrew and rotatably mounted one in each housing, said ballscrew having a length stored in each housing when said housings are in proximate relation to each other, a first of said pair of housings rotatably mounting a first of said pair of ballnuts, a primary drive unit and a backup drive unit mounted on said first housing for selectively rotating said first ballnut, each of said drive units including a drive motor, a shiftable clutch, and means for engaging and disengaging the clutch with the first ballnut, a second of said housings rotatably mounting a second of the ballnuts, and a third drive unit mounted on said second housing including a drive motor geared to the second ballnut.

13. An actuator as defined in claim 12 wherein said ballscrew has a length at least twice the desired stroke of the actuator and approximately one-half the length is stored in said second housing during operation by a drive motor of either of said primary and backup drive units.

14. An actuator as defined in claim 12 wherein the third drive unit motor is geared to the second ballnut by nonback driving gearing.

15. An actuator as defined in claim 12 including means connecting said ballscrew to said second housing to permit linear movement therebetween while preventing relative rotation.

16. An actuator which is dual failure tolerant comprising, a ballscrew, a pair of ballnuts on said ballscrew, first and second housings each rotatably mounting one of the ballnuts, a pair of independently operable drive units on the first housing and each having a drive motor, means for drivingly connecting one or the other of said drive motors to a first of said pair of ballnuts associated with the first housing including a pair of clutches having disengaged positions and engaged positions for selectively connecting one of the drive motors to said first ballnut, and a third drive unit on the second housing including a drive motor, and means drivingly connecting the third drive unit motor to the second of said pair of ballnuts.

17. An actuator as defined in claim 16 including means connecting said ballscrew to said second housing to permit linear movement therebetween while preventing relative rotation.

18. An actuator as defined in claim 16 including preloaded spring means between movable components of said second housing to limit the loading transmitted through the actuator.

19. An actuator as defined in claim 16 wherein each of said independently operable drive units includes a motor-driven worm gear and a worm wheel for transmitting motion to the associated ballnut, and said worm wheels being splined one to each of said clutches to permit relative movement between a worm wheel and a clutch.

* * * * *